United States Patent
Fujii et al.

(10) Patent No.: US 7,980,830 B2
(45) Date of Patent: Jul. 19, 2011

(54) ELECTRIC PUMP

(75) Inventors: Toshiro Fujii, Kariya (JP); Yoshiyuki Nakane, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 911 days.

(21) Appl. No.: 11/655,326

(22) Filed: Jan. 19, 2007

(65) Prior Publication Data

US 2007/0176512 A1    Aug. 2, 2007

(30) Foreign Application Priority Data

Jan. 24, 2006  (JP) .................................. 2006-015549

(51) Int. Cl.
*F04B 9/00*   (2006.01)
(52) U.S. Cl. ........................ 417/319; 417/321
(58) Field of Classification Search .................. 417/319, 417/321; 464/112, 160; 310/261.1, 90, 114, 310/216.121, 216.124, 75 D, 100, 211, 51.3
See application file for complete search history.

(56) References Cited

U.S. PATENT DOCUMENTS

| | | | | |
|---|---|---|---|---|
| 3,347,451 A | * | 10/1967 | Vind | 417/415 |
| 4,750,872 A | * | 6/1988 | Palliser | 417/423.11 |
| 5,369,325 A | * | 11/1994 | Nagate et al. | 310/156.54 |
| 5,569,022 A | * | 10/1996 | Rossi | 417/319 |
| 5,873,786 A | * | 2/1999 | Hosoya et al. | 464/73 |
| 5,957,667 A | * | 9/1999 | Epp | 417/271 |
| 6,291,920 B1 | * | 9/2001 | Miller et al. | 310/261.1 |
| 6,809,440 B2 | * | 10/2004 | Peterreins | 310/51 |
| 2005/0110446 A1 | * | 5/2005 | Kagami et al. | 318/471 |
| 2007/0177999 A1 | | 8/2007 | Fujii et al. | |

FOREIGN PATENT DOCUMENTS

| | | |
|---|---|---|
| JP | 63-004934 U | 1/1988 |
| JP | 08-242565 | 9/1996 |
| JP | 2003-161276 | 6/2003 |
| JP | 2005-155586 | 6/2005 |
| JP | 2005-201195 A | 7/2005 |
| JP | 2005-207328 | 8/2005 |
| JP | 2005-251463 | 9/2005 |
| JP | 2007-192181 A | 8/2007 |
| KR | 20030084321 | 11/2003 |

OTHER PUBLICATIONS

Korean Office Action dated Oct. 26, 2007 issued by Korean Patent Office for application No. 2007-0006795 without English translation.
Office Action for corresponding Japanese Application No. 2006-015549, dated Oct. 26, 2010.
Notice of Allowance for corresponding Japanese Application No. 2006-015549, dated Jan. 25, 2011.

* cited by examiner

*Primary Examiner* — William H Rodriguez
*Assistant Examiner* — Dnyanesh Kasture
(74) *Attorney, Agent, or Firm* — Locke Lord Bissell & Liddell LLP

(57) ABSTRACT

A rotary shaft is rotatable relative to a motor rotor. A first end face of the motor rotor is exposed to the outside of a stator. A hammer portion is provided at the first end face. The hammer portion is configured to be movable as the motor rotor rotates. A collision portion rotating integrally with the rotary shaft is configured to collide with the hammer portion. The allowance space between the collision portion and the hammer portion allows the hammer portion to be move relative to the collision portion. Therefore, the electric pump is capable of detaching a rotor from a pump chamber without increasing the size of the pump.

4 Claims, 2 Drawing Sheets

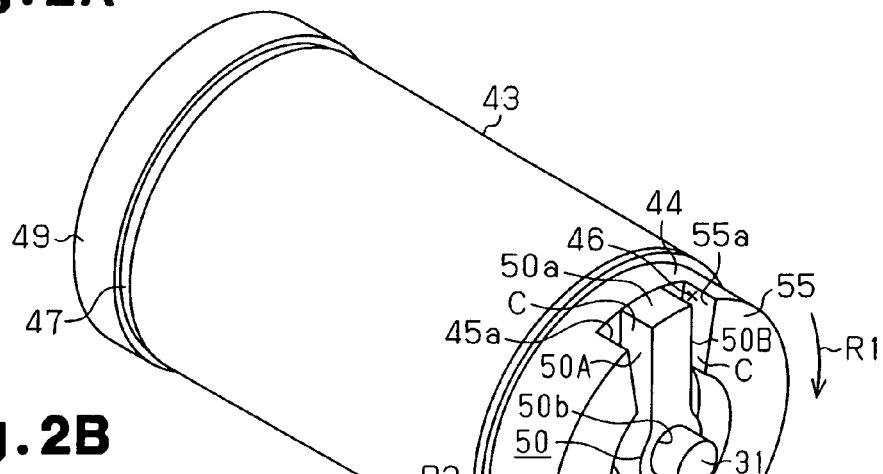
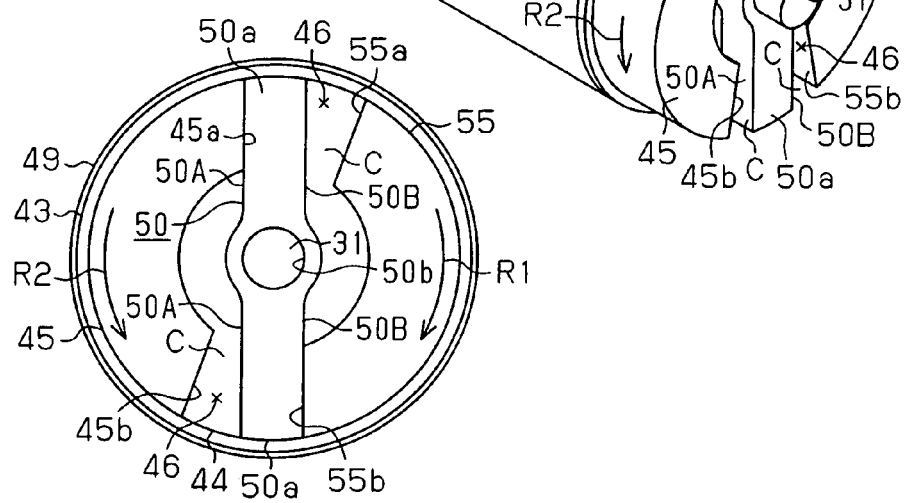
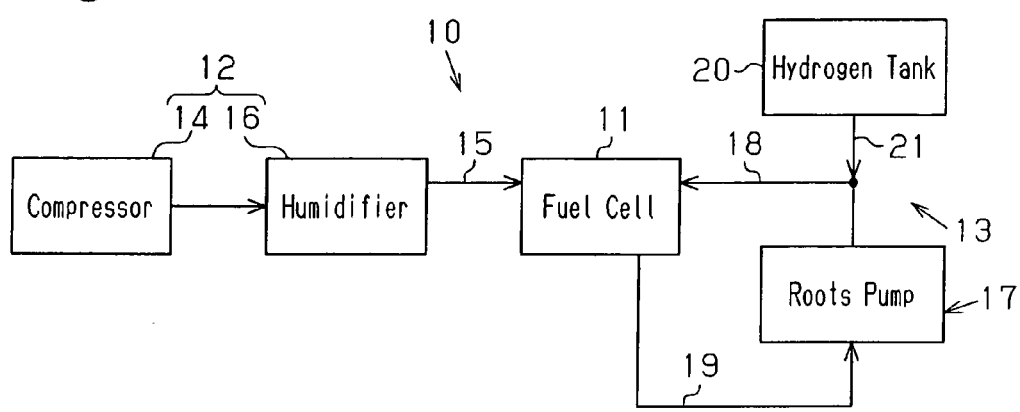

ELECTRIC PUMP

BACKGROUND OF THE INVENTION

The present invention relates to an electric pump in which a rotary shaft rotated by an electric motor is supported in a housing. A rotor, which rotates along with rotation of the rotary shaft, is accommodated in a pump chamber.

For example, Japanese Laid-Open Patent Publication No. 8-242565 discloses a centrifugal pump that rotates a rotor to transfer fluid. The centrifugal pump disclosed in Japanese Laid-Open Patent Publication No. 8-242565 has a permanent magnet synchronous motor to rotate a rotary shaft. As the shaft is rotated, an impeller (rotor) accommodated in a casing is rotated. By means of centrifugal force produced by the rotation of the impeller, fluid (liquid) is transferred. The permanent magnet synchronous motor of the centrifugal pump has a permanent magnet rotor inside of a stator. The permanent magnet rotor is accommodated in a cup-shaped element and has an integrally formed power transmitting tooth. The shaft has a ridge that rotates integrally with the shaft. A lid, to which the ridge is attached, seals the cup-shaped element such that the lid rotates integrally with the cup-shaped element. Further, a shock-absorbing element made of elastomer is accommodated in the cup-shaped element. The shock-absorbing element is arranged between the power transmission tooth and the ridge with respect to the moving direction of the tooth.

In the centrifugal pump disclosed in Japanese Laid-Open Patent Publication No. 8-242565, when the power transmission tooth is rotated as the permanent magnet rotor in the permanent magnet synchronous motor rotates, the tooth freely rotates in a predetermined rotation angle. Thereafter, the power transmission tooth contacts the shock-absorbing element, and the shock-absorbing element then contacts the ridge. This rotates the lid and the cup-shaped element. Since the lid is coupled to the shaft, the shaft is rotated. Further, as the shaft rotates, the impeller rotates to achieve the pumping action. During the operation of the centrifugal pump, the shock-absorbing element applies frictional force to the wall of the cup-shaped element. The frictional force reduces the shock produced when the power transmission tooth contacts the ridge. Such reduction of shock results in a lowered level of knocking noise.

Fuel-cell vehicles, which have a fuel-cell system, are now attracting attention. A fuel cell in such a fuel-cell system causes hydrogen and oxygen to react with each other to generate electricity. The vehicle drives by means of electricity generated by the fuel cell. A fuel-cell system includes a hydrogen circuit for re-supplying unreacted hydrogen gas ("hydrogen off-gas"), which has not been used in the fuel cell, to the fuel cell. The hydrogen circuit has a pump for transferring hydrogen off-gas. The pump is driven by force of an electric motor.

As the fuel cell generates electricity, water is produced. The water is discharged from the fuel cell together with the hydrogen off-gas, and the water and the hydrogen off-gas are sent to the pump chamber in the pump. When the fuel-cell system operates in a cool environment, the water drawn into the pump chamber is condensed between a rotor (for example, pump rotor) accommodated in the pump chamber and the inner wall of the pump chamber or on an outer surface of the rotor. Further, if the fuel-cell system is stopped after being operated in a cool environment below freezing, the condensed water will be frozen, which may adhere the rotor with the inner wall of the pump chamber. If the rotor is adhered with the pump chamber inner wall, the rotor needs to be detached from the pump chamber inner wall when restarting the fuel-cell system. Therefore, in the case where the rotor and the pump chamber inner wall are adhered to each other, a great torque needs to be generated when restarting the system, so as to detach the rotor from the inner wall. Accordingly, a large sized electric motor capable of generating the great torque is needed. The size of the pump therefore needs to be increased.

In the centrifugal pump disclosed in Japanese Laid-Open Patent Publication No. 8-242565, friction is positively produced between the shock-absorbing element and the cup-shaped element, so that the shock between the power transmission tooth and the ridge is reduced. Therefore, when activating the centrifugal pump, the torque generated at the shaft is small, and it is impossible to detach the rotor (an impeller in Japanese Laid-Open Patent Publication No. 8-24256) from the inner wall of the rotor chamber by such a small torque in the case of adhesion due to frozen water as described above.

SUMMARY OF THE INVENTION

Accordingly, it is an objective of the present invention to provide an electric pump that is capable of detaching a rotor from a pump chamber without increasing the size of the pump.

To achieve the foregoing objectives and in accordance with the purpose of the present invention, an electric pump including a housing, a rotor, a rotary shaft, an electric motor, a hammer portion, and a collision portion is provided. The housing defines a pump chamber. The rotor is accommodated in the pump chamber. The rotary shaft is rotatably supported by the housing. The rotor rotates as the rotary shaft rotates. The electric motor rotates the rotary shaft, and is accommodated in the housing. The electric motor includes a stator and a motor rotor located inside of the stator. The rotary shaft extends through the motor rotor such that the rotary shaft is rotatable relative to the motor rotor. The motor rotor has a first end face and a second end face. The first and second end faces form end faces of the rotary shaft with respect to an axial direction. The first end face is exposed to the outside of the stator. The hammer portion is provided at the first end face, and is configured to be movable in a rotating direction of the motor rotor as the motor rotor rotates. The collision portion protrudes from the rotary shaft such that the collision portion rotates integrally with the rotary shaft. The collision portion is configured to collide with the hammer portion. The collision portion and the hammer portion define an allowance space between the collision portion and the hammer portion with respect to the rotating direction of the motor rotor. The allowance space allows the hammer portion to move relative to the collision portion such that the hammer portion directly collides with the collision portion.

BRIEF DESCRIPTION OF THE DRAWINGS

FIG. 2A is a perspective view illustrating a motor rotor, hammer portions, and a collision member;

FIG. 2B is a front view illustrating the motor rotor, the hammer portions, and the collision member; and FIG. 3 is a diagram showing a fuel-cell system.

DETAILED DESCRIPTION OF THE PREFERRED EMBODIMENTS

Figure 1:
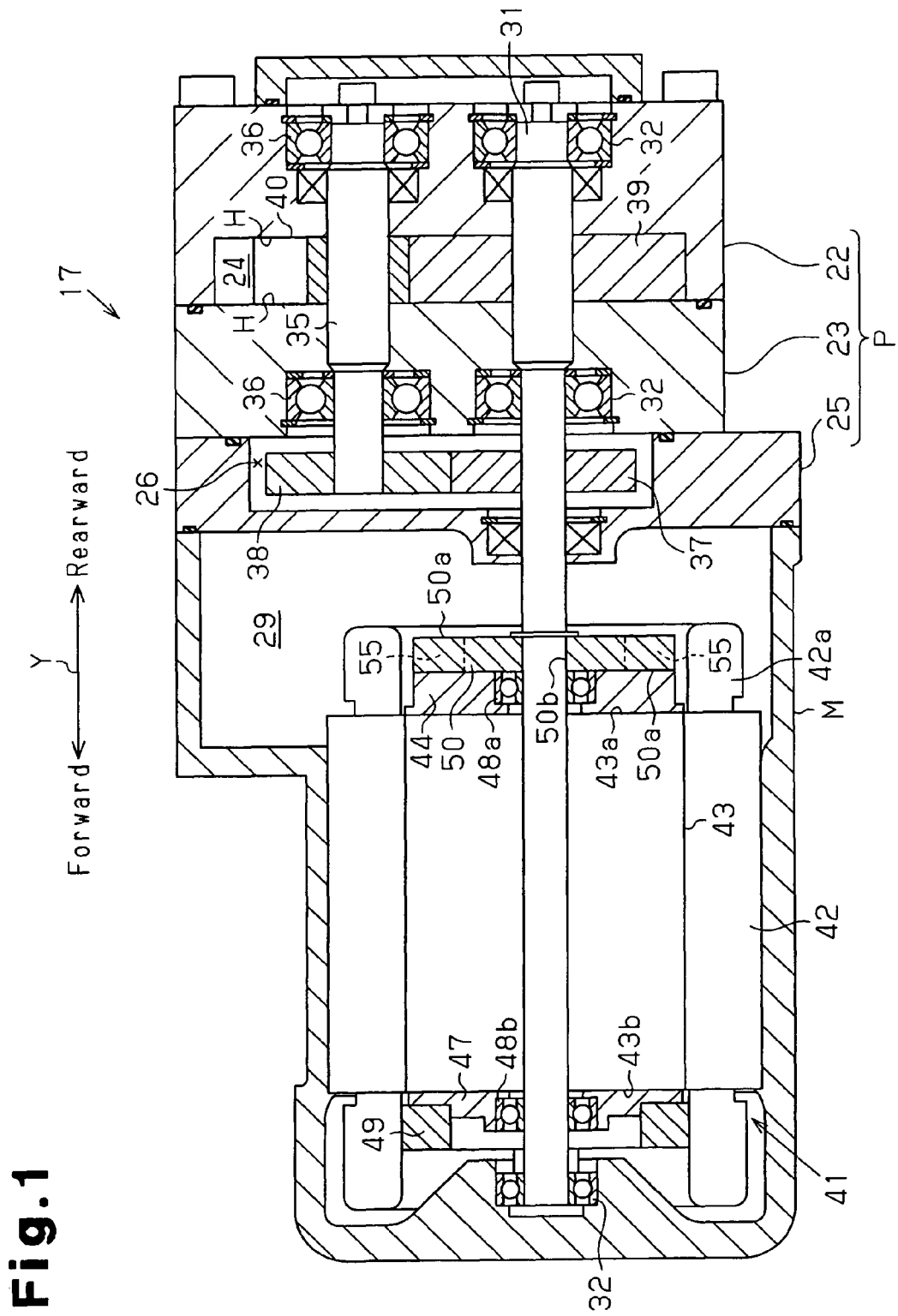
FIG. 1 is a cross-sectional view illustrating a roots pump according to one embodiment.

An electric pump according to one embodiment of the present invention will be described with reference to FIGS. 1 to 3. In this embodiment, the electric pump is embodied as a roots pump used as a hydrogen circulation pump in a fuel-cell system 10. The fuel-cell system 10 has a fuel cell 11, oxygen supplying means 12, and hydrogen supplying means 13 a shown in FIG. 3. The fuel cell 11 is, for example, a polymer electrolyte membrane fuel cell, which causes oxygen supplied from the oxygen supplying means 12, and hydrogen supplied from the hydrogen supplying means 13 to react with each other, thereby generating direct current electric energy (direct current electricity). The oxygen supplying means 12 includes a compressor 14 for compression air. The compressor 14 is connected to an oxygen supply port (not shown) of the fuel cell 11 with a pipe 15. A humidifier 16 is provided on the pipe 15.

The hydrogen supplying means 13 includes an electric pump, or a roots pump 17 that recirculates hydrogen gas ("hydrogen off-gas) that has not been used in the fuel cell 11. That is, the roots pump 17 is provided for recirculating hydrogen off-gas, which has not been used in the fuel cell 11, to the fuel cell 11. The roots pump 17 is connected to a hydrogen supply port (not shown) of the fuel cell 11 with a pipe 18, and is connected to a hydrogen discharge port (not shown) of the fuel cell 11 with a pipe 19. The hydrogen supplying means 13 includes a hydrogen tank 20 serving as a hydrogen source (hydrogen gas supply source). The hydrogen tank 20 is connected to the pipe 18 with a pipe 21, on which a regulator (not shown) is provided. The roots pump 17 and the pipes 18, 19 form a hydrogen circuit capable of supplying hydrogen off-gas, which has not been used in the fuel cell 11, to the fuel cell 11 together with hydrogen newly supplied by the hydrogen tank 20.

The roots pump 17 will now be described. In the following, the forward and rearward directions of the roots pump 17 refer to directions indicated by arrow Y in FIG. 1.

As shown in FIG. 1, a housing of the roots pump 17 according to the present embodiment includes a pump housing P and a motor housing M. The pump housing P includes a rotor housing member 22, a shaft support member 23, and a gear housing member 25. The shaft support member 23 is secured to the front end (left end as viewed in FIG. 1) of the rotor housing member 22, and the gear housing member 25 is secured to the front end (left end as viewed in FIG. 1) of the shaft support member 23. In the pump housing P, a rotor chamber 24, which serves as a pump chamber, is defined between the rotor housing member 22 and the shaft support member 23. In the rotor chamber 24, an inner surface of the rotor housing member 22 and an inner surface of the shaft support member 23 serve as inner wall surfaces H of the rotor chamber rotor. A gear chamber 26 is defined between the gear housing member 25 and the shaft support member 23. The motor housing M is secured to the front end (left end as viewed in FIG. 1) of the gear housing member 25. A motor chamber 29 is defined between the gear housing member 25 and the motor housing M. An electric motor 41 is accommodated in the motor chamber 29.

A drive shaft 31 serving as a rotary shaft is rotatably supported by the motor housing M, the rotor housing member 22, and the shaft support member 23 with bearings 32. A driven shaft 35, which is parallel to the drive shaft 31, is rotatably supported by the rotor housing member 22 and the shaft support member 23 with bearings 36.

In the rotor chamber 24, a drive rotor 39 is attached to the drive shaft 31, and a driven rotor 40 is attached to the driven shaft 35. In the drive rotor 39, a direction along the axial direction of the drive shaft 31 is defined as an axial direction of the drive rotor 39. In the driven rotor 40, a direction along the axial direction of the driven shaft 35 is defined as an axial direction of the driven rotor 40. The drive rotor 39 and the driven rotor 40 form a two-lobe pump. A cross section of the two-lobe pump perpendicular to the axial direction of the drive shaft 31 and the driven shaft 35 is shaped as a cotyledon (gourd).

A small gap exists between each of the front and rear end face of the drive rotor 39 with respect to the axial direction of the drive shaft 31 and the corresponding inner wall surface H of the rotor chamber 24. Also, a small gap exists between each of the front and rear end face of the driven rotor 40 with respect to the axial direction of the driven shaft 35 and the corresponding inner wall surface H of the rotor chamber 24. The gaps prevent seizure due to sliding of the front and rear end faces of the drive rotor 39 and the driven rotor 40 on the inner wall surfaces H of the rotor chamber 24. Also, the gaps are sufficiently narrow to prevent leakage of hydrogen off-gas. The rotor housing member 22 has an inlet and an outlet (neither is shown). The outlet is located in a position opposite to the inlet. Hydrogen off-gas is drawn into the rotor chamber 24 through the inlet, and discharged from the rotor chamber through the outlet. A drive gear 37 is fixed to the drive shaft 31, and a driven gear 38 is fixed to the driven shaft 35. The drive gear 37 and the driven gear 38 are located in the gear chamber 26 and meshed with each other.

In the roots pump 17 described above, when the drive shaft 31 is rotated by the electric motor 41, the driven shaft 35 is rotated in a direction different from the rotating direction of the drive shaft 31 through the meshing engagement between the drive gear 37 and the driven gear 38. Then, in the rotor chamber 24, the drive rotor 39 and the driven rotor 40 rotate. As the drive rotor 39 and the driven rotor 40 rotate, hydrogen off-gas discharged from the fuel cell 11 is drawn into the rotor chamber 24 through the inlet via the pipe 19. Thereafter, the outer surfaces of the drive rotor 39 and the driven rotor 40 and the inner wall surfaces H of the rotor chamber 24 operate together to send the drawn hydrogen off-gas to the outlet of the rotor chamber 24 and discharge the off-gas to the pipe 18 outside of the rotor chamber 24 through the outlet. Subsequently, the hydrogen off-gas discharged to the pipe 18 is re-supplied to the fuel cell 11 together with newly supplied hydrogen gas from the hydrogen tank 20.

The electric motor 41 will now be described.

The electric motor 41 includes a stator 42 attached to the inner surface of the motor housing M and a motor rotor 43, which rotates in both forward and reverse directions relative to the stator 42. That is, the motor rotor 43 rotates both in a direction shown by arrow R1 (forward direction and a direction shown in arrow R2 (reverse direction) in FIGS. 2A and 2B. As shown in FIG. 1, the stator 42 has stator coils 42a, which are connected to an external power source (not shown) with a number of lead wires (not shown). The motor rotor 43 has a cylindrical shape and receives in it the drive shaft 31. A small clearance (not shown) exists between the inner circumferential surface of the motor rotor 43 and the circumferential surface of the drive shaft 31. The drive shaft 31 is supported by the housing to be rotatable relative to the motor rotor 43.

The front and rear ends of the motor rotor 43 with respect to the axial direction of the drive shaft 31 are exposed to the outside from the interior of the stator 42, and spaced from the inner surfaces of the stator coils 42a. A disk-like hammer forming member 44 is attached to one of the front and rear ends, specifically, to a rear end face 43a. In this embodiment, the rear end face 43a is a first end face. The front end face 43b is a second end face. The drive shaft 31 extends through a center portion of the hammer forming member 44. A bearing 48a is located between the inner circumferential surface of the hammer forming member 44 and the circumferential surface of the drive shaft 31. The bearing 48a permits the hammer forming member 44 to rotate relative to the drive shaft 31. The hammer forming member 44 rotates integrally with the motor rotor 43. As shown in FIGS. 2A and 2B, a pair of arcuate hammer portions 45, 55 are integrally formed with the rear end of the hammer forming member 44. The hammer portions 45, 55 extend along rotating direction (directions shown by arrows R1, R2) of the motor rotor 43. Hereinafter, one (left one as viewed in FIGS. 2A and 2B) of the hammer portions 45 will be referred to as a first hammer portion 45, and the other (right one as viewed in FIGS. 2A and 2B) is referred to as a second hammer portion 55.

One end face 45a of the first hammer portion 45 and one end face 55a of the second hammer portion 55 are spaced from each other. Between the facing end faces 45a, 55a, a movement space 46 extending along the rotating direction of the motor rotor 43 is defined. Also, another end face 45b of the first hammer portion 45 and another end face 55b of the second hammer portion 55 are spaced from each other. Between the facing end faces 45b, 55b, a movement space 46 extending along the rotating direction of the motor rotor 43 is defined.

As shown in FIG. 1, a disk-like weight attaching member 47 is secured to a front end face 43b. The front end face 43b is the second end face (the other end face) of front and rear end faces of the motor rotor 43 with respect to the axial direction of the drive shaft 31. The drive shaft 31 extends through a center portion of the weight attaching member 47. A bearing 48b is located between the inner circumferential surface of the weight attaching member 47 and the circumferential surface of the drive shaft 31. The bearing 48b permits the weight attaching member 47 to rotate relative to the drive shaft 31. The weight attaching member 47 rotates integrally with the motor rotor 43. A brass weight 49 is attached to the front face of the weight attaching member 47. The weight 49 rotates integrally with the weight attaching member 47 and the motor rotor 43. The weight 49 increases the magnitude of inertia of the motor rotor 43 in relation to rotation, or moment of inertia, thereby suppressing fluctuations in rotation of the motor rotor 43.

As shown in FIGS. 2A and 2B, a collision member 50 is attached to a portion of the drive shaft 31 that corresponds to the rear end of the motor rotor 43. The collision member 50 rotates integrally with the drive shaft 31. The collision member 50 has a fastening hole 50b at a center in the longitudinal direction. The drive shaft 31 is fitted in the fastening hole 50b. The collision member 50 is located in the hammer forming member 44 between the first hammer portion 45 and the second hammer portion 55. The collision member 50 has a pair of collision portions 50a radially extending in opposite directions from the drive shaft 31. That is, the collision member 50 has a shape that extends linearly along a radial direction of the drive shaft 31. Each collision portion 50a is located in a movement space 46.

A first side surface 50A of the collision member 50, which faces the end faces 45a, 45b of the first hammer portion 45, and a second side surface 50B, which faces the end faces 55a, 55b of the second hammer portion 55 are each formed flat except for a center portion. When the motor rotor 43 rotates in one direction (forward direction shown by arrow R1), the end face 45a of the first hammer portion 45 collides with the first side surface 50A of the collision member 50. At the same time, the end face 55b of the second hammer portion 55 collides with the second side surface 50B. On the other hand, when the motor rotor 43 rotates in the other direction (reverse direction shown by arrow R2), the end face 45b of the first hammer portion 45 collides with the first side surface 50A of the collision member 50. At the same time, the end face 55a of the second hammer portion 55 collides with the second side surface 50B.

The size of the movement spaces 46 is determined such that a gap C along the rotating direction of the motor rotor 43 is defined between at least one of the end faces 45a, 55a defining one of the movement spaces 46 and one of the first and second side surfaces 50A, 50B, and between at least one the end faces 45b, 55b defining the other movement space 46 and one of the first and second side surfaces 50A, 50B.

The open width of each movement space 46 along the rotating direction of the motor rotor 43 is determined such that, when the motor rotor 43 (the first hammer portion 45) rotates in the rotating direction of the motor rotor 43 by 2°, any of the end faces 45a, 45b, 55a, 55b of the first and second hammer portions 45, 55 collides with the corresponding collision portion 50a. That is, each movement space 46 functions as an allowance space. For example, the allowance space corresponding to the first hammer portion 45 allows the first hammer portion 45 to move relative to the corresponding collision portion 50a so that the first hammer portion 45 directly collides with the collision portion 50a. The open width of the movement spaces 46 may be changed. Specifically, the open width of the movement spaces 46 is determined such that, in the limited size of the roots pump 17, impact torque produced by collision between the hammer portions 45, 55 and the collision portions 50a has a desired value. When increasing the impact torque, the shapes and positions of the first hammer portion 45 and the second hammer portion 55 to increase the open width of the movement spaces 46. The first hammer portion 45 and the second hammer portion 55 contact the collision portions 50a of the collision member 50 to transmit rotation of the motor rotor 43 to the drive shaft 31.

When the fuel-cell system 10 is in an operating state and the roots pump 17 is operating, hydrogen off-gas containing water produced in the fuel cell 11 is drawn into the rotor chamber 24 through the inlet via the pipe 19. In a cool environment, the water condenses on the inner wall surfaces H of the rotor chamber 24 and surfaces of the drive rotor 39 and the driven rotor 40. Further, if the fuel-cell system 10 is stopped after being operated in a cool environment below freezing, and the drive rotor 39 and the driven rotor 40 are stopped, accordingly, the water in the rotor chamber 24 will be frozen. The frozen water adheres the front and rear end faces of the drive rotor 39 and the driven rotor 40 with the inner wall surfaces H of the rotor chamber 24.

When starting the fuel-cell system 10 from the frozen state, the roots pump 17 is activated by supplying a current to the stator coils 42a of the electric motor 41 from the external power source. Accordingly, electromagnetic induction between the stator coils 42a and the motor rotor 43 causes the motor rotor 43 to rotate in the forward direction shown by arrow R1, thereby generating starting torque. Since the weight 49 is attached to the motor rotor 43 with the weight attaching member 47, the rotation speed of the motor rotor 43 is accelerated as the rotation speed (power) of the motor rotor 43 is increased. In addition, the hammer forming member 44 is attached to the rear end face 43a, which does not face the inner surface of the stator 42 but is exposed to the outside of the stator 42, 15 and the first hammer portion 45 and the second hammer portion 55 are spaced from the inner surface of the stator coils 42a. Therefore, when the motor rotor 43 rotates, the first hammer portion 45 and the second hammer portion 55 do not contact the stator 42 or the stator coils 42a. The rotation speed of the motor rotor 43 is prevented from being reduced by friction caused by such contact.

As the motor rotor 43 rotates, the first hammer portion 45 and the second hammer portion 55 move in the rotating direction of the motor rotor 43, so that the end face 45a of first hammer portion 45 collides with the first side surface 50A of the collision portions 50a, and the end face 55b of the second hammer portion 55 collides with the second side surface 50B of the collision portions 50a. At this time, impact torque based on the collision is produced in the collision portions 50a. Accordingly, impact torque is produced in the drive shaft 31, which rotates integrally with the collision portions 50a. This rotates the drive shaft 31.

The produced impact torque is transmitted to the driven shaft 35 through the engagement between the drive gear 37 and the driven gear 38, and then to the drive rotor 39 and the driven rotor 40. The impact torque rotates the drive rotor 39 and the driven rotor 40. As a result, the ice that adheres the front and rear end faces of the drive rotor 39 and the front and rear end faces of the driven rotor 40 with the inner wall surfaces H of the rotor chamber 24 is crushed, so that the drive rotor 39 and the driven rotor 40 are detached from the inner wall surfaces H of the rotor chamber 24, and the drive rotor 39 and the driven rotor 40 are separated from the rotor chamber 24. After the drive rotor 39 and the driven rotor 40 are detached from the rotor chamber 24, rotation of the motor rotor 43 is transmitted to the drive shaft 31 by means of contact of the first hammer portion 45 and the second hammer portion 55 with the collision member 50 (the collision portions 50a), so that the roots pump 17 is operated.

The above described embodiment has the following advantages.

(1) The motor rotor 43 of the electric motor 41 is rotatable relative to the drive shaft 31, and the first hammer portion 45 and the second hammer portion 55 are configured to rotate integrally with the motor rotor 43. Further, the drive shaft 31 has the collision portions 50a integrally formed with the drive shaft 31, and the collision portions 50a are caused to collide with the first hammer portion 45 and the second hammer portion 55. When the electric motor 41 is started, rotation of the motor rotor 43 causes the first hammer portion 45 and the second hammer portion 55 collide with the collision portions 50a. This produces impact torque in the drive shaft 31. The produced impact torque rotates the drive shaft 31. As the drive shaft 31 is rotated by the impact torque, the drive rotor 39 and the driven rotor 40 are rotated. The rotation of the drive rotor 39 and the driven rotor 40 detaches the drive rotor 39 and the driven rotor 40 from the inner wall surfaces H of the rotor chamber 24. As a result, when starting the roots pump 17, the drive rotor 39 and the driven rotor 40 are detached from the rotor chamber 24 simply by generating starting torque. Therefore, when starting the roots pump 17, no torque needs to be generated in addition to the starting torque of the roots pump 17 to detach the drive rotor 39 and the driven rotor 40 from the rotor chamber 24. As a result, no large sized electric motor that generates a great torque is required for detaching the drive rotor 39 and the driven rotor 40 from the rotor chamber 24 of the roots pump 17. The size of the roots pump 17 is not therefore increased.

(2) The first and second hammer portions 45, 55 are formed by attaching the hammer forming member 44 to the rear end face 43a of the motor rotor 43, which is exposed to the outside of the stator 42, and the first and second hammer portions 45, 55 are spaced from the inner circumferential surface of the stator coils 42a. Therefore, when the motor rotor 43 rotates, the first and second hammer portions 45 are permitted to directly collide with the collision portions 50a without causing the hammer forming member 44 to contact the stator 42 and the stator coils 42a. Thus, rotational force of the motor rotor 43 is prevented from being reduced by friction caused by the contact. Accordingly, the impact force applied to the collision portions 50a of the first and second hammer portions 45, 55 is not reduced. Therefore, impact torque is efficiently produced in the drive shaft 31, so that the drive rotor 39 and the driven rotor 40 are detached from the inner wall surfaces H of the rotor chamber 24.

(3) A pair of the collision portions 50a extend in opposite directions from the drive shaft 31. When the electric motor 41 rotates, the first hammer portion 45 and the second hammer portion 55 each collide with the corresponding collision portion 50a. Therefore, compared to a configuration in which only one collision portion 50a is provided, impact torque generated by collision between the collision portions 50a and the first and second hammer portions 45, 55 is increased. Therefore, a greater impact torque is produced, so that the drive rotor 39 and the driven rotor 40 are readily detached from the rotor chamber 24.

(4) The first hammer portion 45 and the second hammer portion 55 are arranged with the collision member 50 in between. Therefore, regardless of which of the forward and reverse directions the motor rotor 43 of the electric motor 41 rotates, the first hammer portion 45 and the second hammer portion 55 collide with the collision portions 50a. Thus, for example, by alternately reversing the rotating direction of the electric motor 41, impact torques of different directions can be produced. Ice is thus readily crushed.

(5) The first hammer portion 45 and the second hammer portion 55 are provided in the motor rotor 43 by attaching the hammer forming member 44 to the rear end face 43a of the motor rotor 43. Therefore, for example, compared to a case in which the first and second hammer portions 45, 55 are formed integrally with the motor rotor 43, the manufacture is facilitated. The structure for detaching the drive rotor 39 and the driven rotor 40 from the rotor chamber 24 is simplified.

(6) The motor rotor 43 has the weight 49, which rotates integrally with the motor rotor 43. The weight 49 increases the torque of the motor rotor 43, so that the rotation of the motor rotor 43 is prevented from being decelerated. Therefore, when the first hammer portion 45 and the second hammer portion 55 collide with the collision portions 50a, a great impact torque is produced in the drive shaft 31, and the drive rotor 39 and the driven rotor 40 are readily detached from the inner wall surfaces H of the rotor chamber 24.

(7) The roots pump 17 is used for transfer hydrogen off-gas in the hydrogen circuit of the fuel-cell system 10. When the roots pump 17 is used in a hydrogen circuit, water produced during electricity generation by the fuel cell 11 enters the rotor chamber 24. In a cool environment, the drive rotor 39 and the driven rotor 40 tend to be adhered to the rotor chamber 24 by frozen water. However, since the electric motor 41 is provided with the first and second hammer portions 45, 55, and the collision portions 50a attached to the drive shaft 31, the drive rotor 39 and the driven rotor 40 are detached from the rotor chamber 24 without increasing the size of the electric motor 41. Thus, the configuration in which the electric motor 41 of the roots pump 17 has the first hammer portion 45 and the second hammer portion 55, and the drive shaft 31 has the collision portions 50a is particularly suitable for the hydrogen circulation pump in the fuel-cell system 10.

The preferred embodiment may be modified as follows.

The weight 49 may be omitted.

The hammer forming member 44 may be attached to each of the front and rear end faces 43a, 43b of the motor rotor 43 along the axial direction, so that the hammer portions 45, 55 are provided at the front end and the rear end of the motor rotor 43. Further, the collision members 50 may be attached to the drive shaft 31 to correspond to both hammer portions 45, 55. In this case, the weight attaching member 47 and the weight 49 are omitted. Impact torque may be produced both at the front and rear end of the motor rotor 43 by causing the hammer portions 45, 55 to collide with the collision portions 50a. Alternatively, the hammer forming member 44 may be attached to only the front end faces 43b of the motor rotor 43, so that the hammer portions 45, 55 are provided only at the front end of the motor rotor 43. Further, the collision members 50 may be attached to the drive shaft 31 to correspond to both hammer portions 45, 55.

One of the collision portions 50a of the collision member 50 may be omitted.

One of the hammer portions 45, 55 may be omitted.

In the illustrated embodiment, a drive rotor and a driven rotor each having three or more lobes may be used in the roots pump 17.

In the illustrated, the roots pump 17 may be a multistage pump in which a number of the drive rotors 39 and the driven rotors 40 are fixed to the drive shaft 31 and the driven shaft 35 along the axial direction.

The roots pump 17 of the illustrated embodiment may be used as the compressor 14 in the oxygen supplying means 12 of the fuel-cell system 10.

The roots pump 17 of the illustrated embodiment may be used as a vacuum pump used in semiconductor manufacturing apparatuses. In this case, when gas used in a semiconductor manufacturing apparatus is cooled, deposited material adhere the drive rotor 39 and the driven rotor 40 to the rotor chamber 24. However, by using the roots pump 17, the drive rotor 39 and the driven rotor 40 are detached from the rotor chamber 24 without increasing the size of the electric motor 41.

In the illustrated embodiment, the present invention is applied to the electric roots pump 17 having the drive rotor 39 and the driven rotor 40. However, the present invention may be applied to an electric screw pump having a screw rotor accommodated in a pump chamber.

The invention claimed is:

1. An electric pump, comprising:
 a housing defining a pump chamber;
 a rotor accommodated in the pump chamber;
 a rotary shaft rotatably supported by the housing, wherein the rotor rotates as the rotary shaft rotates;
 an electric motor that rotates the rotary shaft, the electric motor being accommodated in the housing, the electric motor including a stator and a motor rotor located inside of the stator, the rotary shaft extends through the motor rotor such that the rotary shaft is rotatable relative to the motor rotor, the motor rotor having a first end face and a second end face perpendicular to an axial direction, and the first end face being exposed to the outside of the stator;
 a hammer forming member attached to the first end face;
 a bearing rotatably supporting the hammer forming member relative to the rotary shaft, such that the hammer forming member rotates integrally with the motor rotor;
 a hammer portion integrally formed with the hammer forming member, the hammer portion being configured to be movable in a rotating direction of the motor rotor as the motor rotor rotates; and
 a collision portion protruding from the rotary shaft such that the collision portion rotates integrally with the rotary shaft, the collision portion being configured to collide with the hammer portion, the collision portion and the hammer portion defining an allowance space between the collision portion and the hammer portion with respect to the rotating direction of the motor rotor, and the allowance space allowing the hammer portion to move relative to the collision portion such that the hammer portion directly collides with the collision portion.

2. The electric pump according to claim 1, wherein the collision portion is one of a pair of collision portions extending in opposite directions, the collision portions being arranged with the rotary shaft in between, and wherein the hammer portion is configured to simultaneously collide with the pair of the collision portions.

3. The electric pump according to claim 1, further comprising:
 a weight provided at the motor rotor, the weight integrally rotating with the motor rotor.

4. The electric pump according to claim 1, wherein the electric pump is a roots pump that can be incorporated in a fuel-cell system, wherein the fuel-cell system includes a fuel cell, a hydrogen source for supplying hydrogen gas to the fuel cell, and a hydrogen circuit that unites a flow of hydrogen gas that has not been used in the fuel cell with a flow of hydrogen gas supplied from the hydrogen source, and re-supplies the hydrogen gas of the united flow to the fuel cell, and wherein the electric pump is configured to be incorporated in the hydrogen circuit.

* * * * *